United States Patent [19]

Schoenig et al.

[11] Patent Number: 4,671,478
[45] Date of Patent: Jun. 9, 1987

[54] BOOM ASSEMBLY AND COMPONENTS THEREOF

[75] Inventors: Darrell A. Schoenig; Jon L. Lindskog, both of Fort Collins, Colo.

[73] Assignee: D & D Enterprises, Inc., Fort Collins, Colo.

[21] Appl. No.: 722,054

[22] Filed: Apr. 11, 1985

[51] Int. Cl.⁴ ............................................. F16C 11/06
[52] U.S. Cl. .................................. 248/124; 248/286; 16/19; 403/297
[58] Field of Search ............... 248/122, 124, 168–171, 248/286; 16/19, 34; 403/297

[56] References Cited

U.S. PATENT DOCUMENTS

| | | | |
|---|---|---|---|
| 870,770 | 11/1907 | Fuller | 248/188.9 |
| 1,164,801 | 12/1915 | Frazier | 403/286 |
| 1,231,635 | 7/1917 | Nelson | 248/124 |
| 1,429,443 | 9/1922 | McFaddin | 248/124 |
| 2,192,484 | 3/1940 | Bryan | 403/297 |
| 2,548,650 | 4/1951 | Brandt | 248/124 |
| 2,850,304 | 9/1958 | Wagner | 403/297 |
| 2,945,663 | 7/1960 | Stevens | 248/170 |
| 3,031,215 | 4/1962 | Vance | 248/124 |
| 3,127,888 | 4/1964 | Burnham | 248/124 |
| 3,469,823 | 9/1969 | Blum | 403/297 |
| 4,047,684 | 9/1977 | Kobayashi | 248/122 |

FOREIGN PATENT DOCUMENTS

| | | | |
|---|---|---|---|
| 2403832 | 8/1975 | Fed. Rep. of Germany | 403/297 |
| 2758656 | 7/1978 | Fed. Rep. of Germany | 16/19 |
| 2937571 | 4/1981 | Fed. Rep. of Germany | 16/19 |
| 1188152 | 9/1959 | France | 248/122 |
| 2245870 | 4/1975 | France | 403/297 |

*Primary Examiner*—J. Franklin Foss
*Assistant Examiner*—Robert A. Olson
*Attorney, Agent, or Firm*—Hugh H. Drake

[57] ABSTRACT

A boom assembly has an upright stand with a vertical hollow post and on top of which is mounted an elongated hollow boom adjustable in orientation in both vertical and horizontal directions. A linear extention member for the boom is also in the form of a hollow tube. The stand includes a plurality of legs each in the form of a hollow tube and there are a plurality of foot elements such as casters. The different parts of the assembly are secured together by couplings that preferably are the same in each case. Such couplings include a hollow body with an exterior surface of a size and shape to be inserted within an adjacent hollow tube. A pair of laterally-opposite slots continue longitudinally inward from one end of the body. A lateral spreader is of a size and shape to be located within that one end of the body. A lever has one end portion inserted within the spreader to effect spreading thereof upon lateral deflection of the other end of the lever. Carried by the body are adjustable means located inwardly of the open end portion of the body for laterally deflecting the other end of the lever.

14 Claims, 9 Drawing Figures

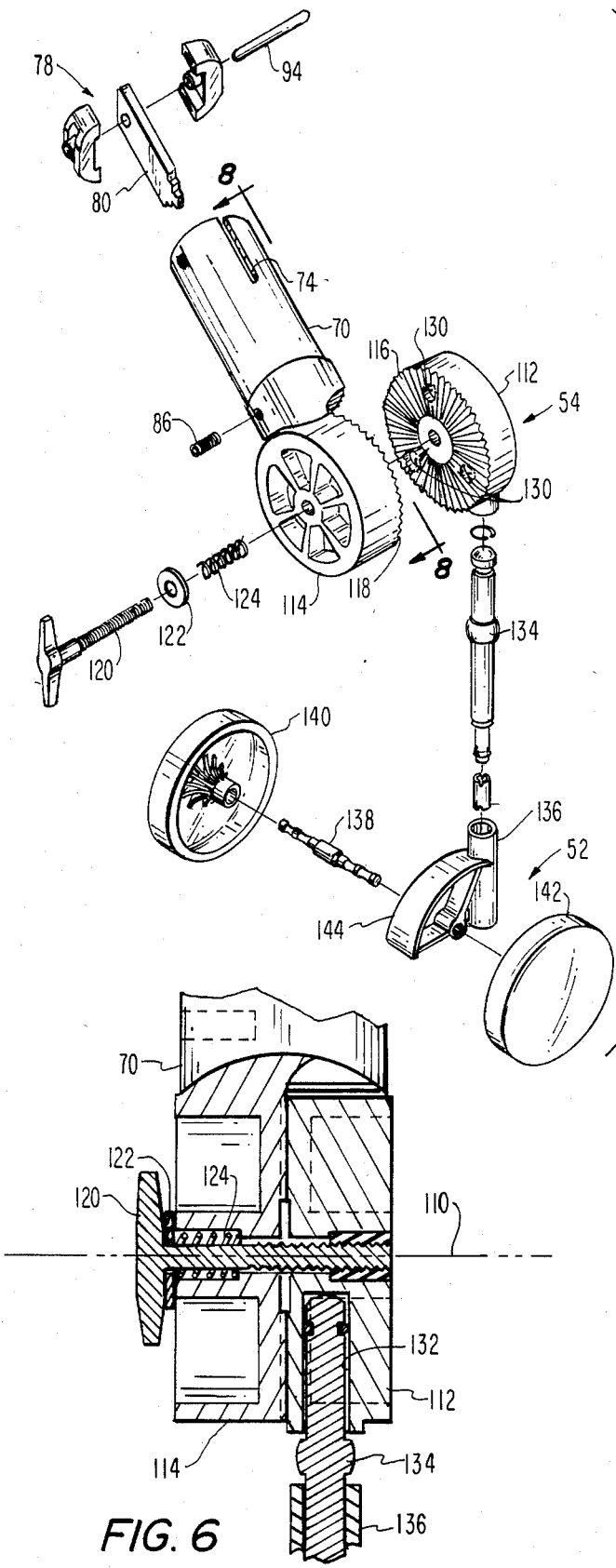
FIG. 7
FIG. 6
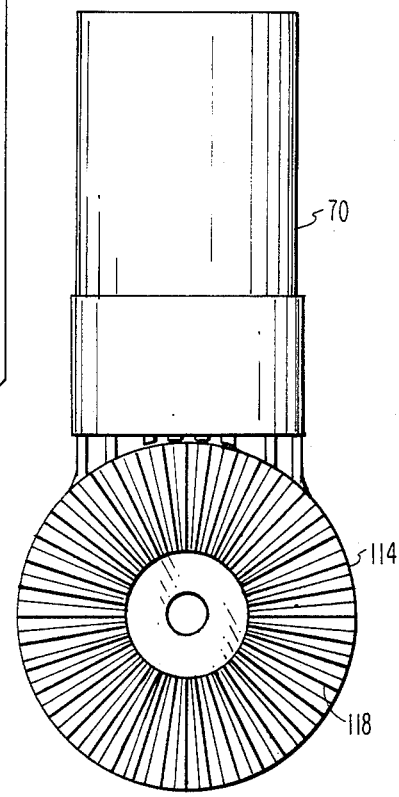
FIG. 8

BOOM ASSEMBLY AND COMPONENTS THEREOF

The invention pertains to a coupling and an assembly which benefits therefrom. More particularly, it relates to a coupling securable within one or more hollow tubes of an apparatus such as a boom assembly.

In the fields of dramatic and musical performances, as well as in photography, use has long been made of boom assemblies for supporting such items as microphones, lights or perhaps even a camera. Such assemblies typically include an upright stand of some kind on top of which is mounted an elongated boom which may, for example, have one end which extends outwardly over an area of performance. At least in many cases, such assemblies have exhibited one or more of difficulty of adjustment, heavy weight, limitation on mobility and lack of ease of disassembly for storage or transport.

One general object of the present invention is to provide a boom assembly which overcomes all such deficiencies which existed in prior arrangements.

A more particular object of the present invention is to provide a boom assembly which specifically is light in weight, readily adjustable, can be easily assembled and which is readily moveable.

A related object to the present invention is to provide a coupling for securing together different portions of a boom assembly with ease of installation or removal.

A related general object to the present invention is to provide a coupling which employs standardized parts and is useful alternatively in different versions of a plurality of couplings.

Another object of the present invention is to provide such a coupling which finds utility in apparatus different from boom assemblies.

In accordance with the invention, a coupling provides securement with an open end portion of a hollow tube. The coupling includes a hollow body that has an exterior surface of a size and shape to accept the open end portion of the hollow tube in ensleevement thereof. In the wall of the body are defined a pair of laterally-opposite slots which continue longitudinally inward from one end of the body. A lateral spreader is of a size and shape to be located within that one end of the body. A lever has one end portion inserted within the spreader to effect spreading thereof upon lateral deflection of the other end of the lever. Adjustable means carried by the body inwardly of the open end portion laterally deflects the other end of the lever.

Other aspects of the invention include combinations of the coupling with various other apparatus such as a boom extension, a unit for mounting a boom on an upright stand and casters for such a stand.

The features of the present invention which are believed to be patentable are set forth with particularity in the appended claims. The organization and manner of operation of the invention, together with further objects and advantages thereof, may best be understood by reference to the following description taken in connection with the accompanying drawings in the several figures of which like reference numerals identify like elements in which:

FIG. 6 is a fragmentary cross-sectional view taken along the line 6—6 in FIG. 5;

FIG. 7 is an exloded isometric view of the coupling of FIG. 5;

FIG. 8 is a side elevational view of a component shown in FIG. 7 and taken along the line 8—8 in the latter.

Figure 1:
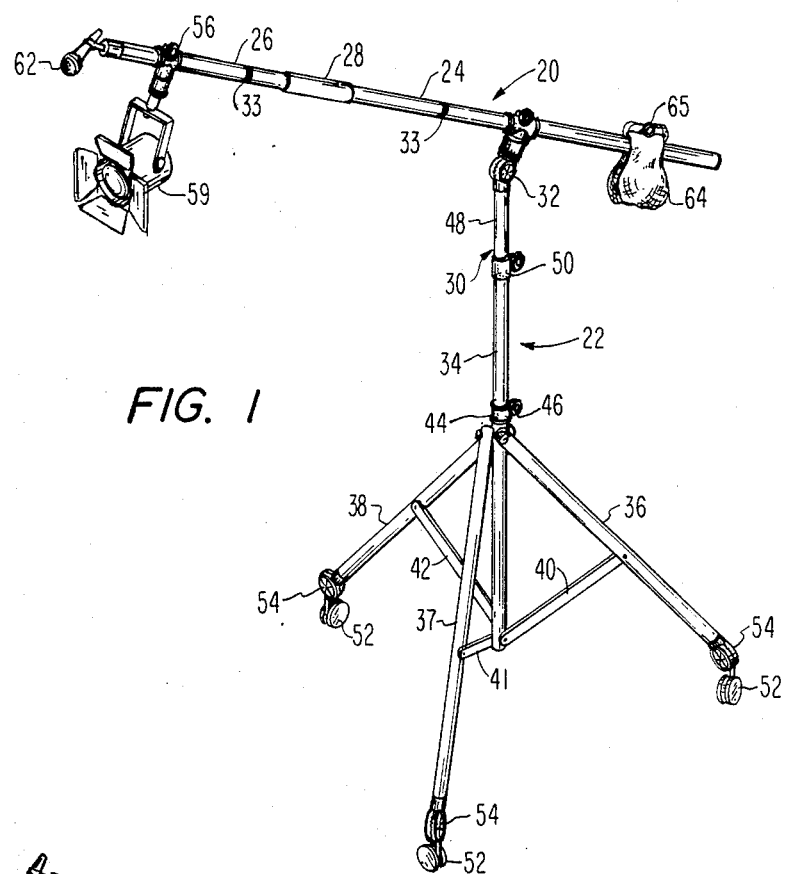
FIG. 1 is an isometric view of a boom assembly.

A boom assembly 20 includes an upright stand 22 on top of which is mounted a boom 24. As illustrated, boom 24 has an extention 26 joined to boom 24 by a coupling 28. Boom 24 is secured to the upper end of an upright post 30 by a swivel joint 32 better depicted in FIG. 9. Various fastening strips 33 may be used along the length of the boom for securing cords which lead to the accessories.

Stand 22 includes an upright tube 34 supported by a tripod formed by legs 36, 37 and 38. A central portion of each of legs 36–38 is connected to the bottom end of tube 34 by corresponding struts 40, 41 and 42 which are pivotally connected at each end. The upper ends of each of legs 36–38 are pivotally coupled to a collar-clamp 44 that is slideable upon tube 34 upon loosening of a knob 46, the collar having been split to allow clamp adjustment. Thus the vertical positioning of collar 44 allows variation in the spread of legs 36–38 with a corresponding adjustment of the height of tube 34. In this case, tube 34 continues by way of an upward extension 48 secured by another split-collar 50. Specifically then, swivel joint 32 mounts atop extension 48. If desired, post 30 in the overall may be a single continuous element.

At the lower end of each of legs 36–38 is a caster 52 joined to the respective leg by a swivel coupling or joint 54 and shown in more detail in FIGS. 6–8. Additional split-collar couplings 56 and 58, shown as being mounted respectively upon boom extension 26 and post extension 48, may support flood lamps 59 and 60 as illustrated strictly by way of example. The number and placement of those lamps would be up to the user.

Similarly in this illustration, there is a microphone 62 attached to the outer end of boom extension 26. Secured to and draped over the end of boom 24 is a counterweight 64. The latter is composed of a pair of bags that contain lead shot or the equivalent to enable substantial weight to be contained within a small device. Of course, counterweight 64 is adjustable along the length of boom 24, by means of a knob 65, in order to achieve a balance with respect to the weight of the forward end of boom 24 and, if used, the weight of its extension element 26 as well as the weight of whatever is chosen to be suspended from the boom. Knob 65 is part of another split collar mounted on the tubing.

In this case, all of legs 36–38, post 30, boom portion 24 and its extension 26 are formed of comparatively thin-walled aluminum round hollow tubing. Although a square or other tube cross-section could be employed, with the different couplings modified to accomodate that difference, the use of round tubing is definitely preferred both for tubing strength and simplicity of manufacture of the different parts. As will become apparent, the preferred use of a standard tubing size for all tubes enables a degree of modularity with numerous different portions of different components being identical, thereby decreasing manufacturing costs.

Figure 2:
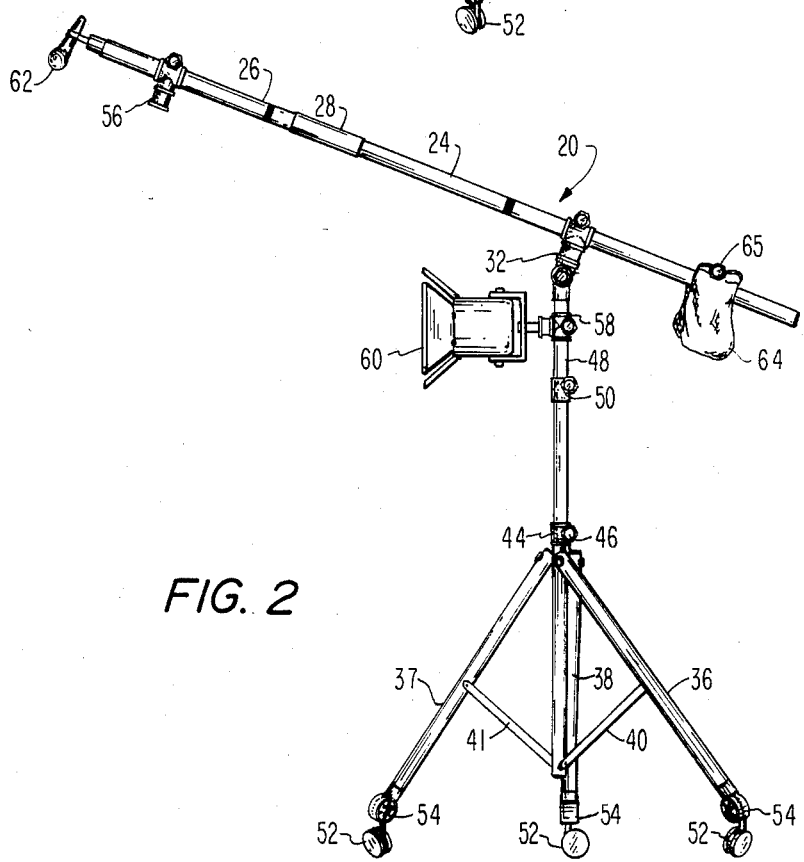
FIG. 2 is a side elevational view thereof.
Figure 3:
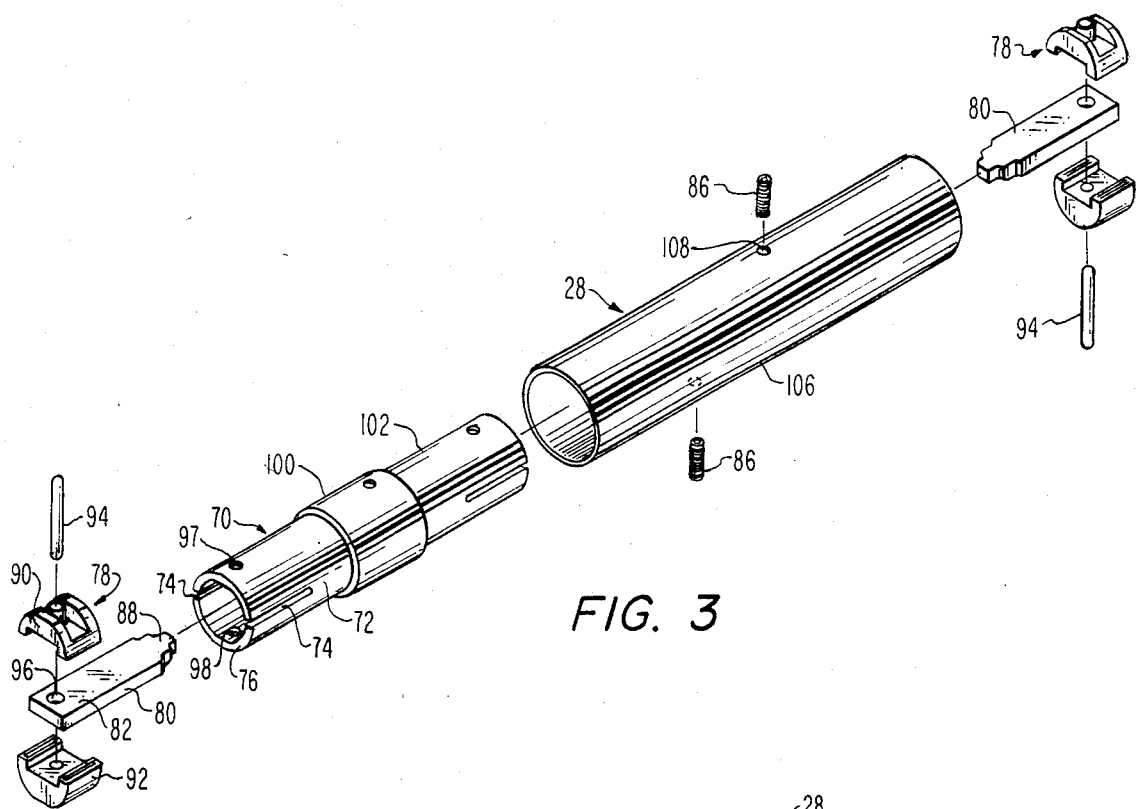
FIG. 3 is an exploded isometric view of one coupling employed the boom assembly of FIGS. 1 and 2.
Figure 4:
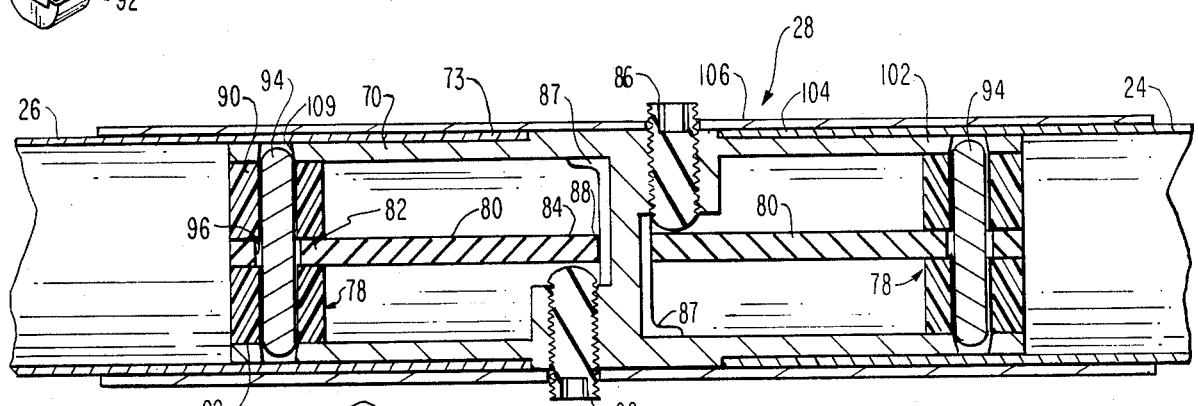
FIG. 4 is a longitudinal cross-sectional view of the coupling of FIG. 3 as assembled.
Figure 5:
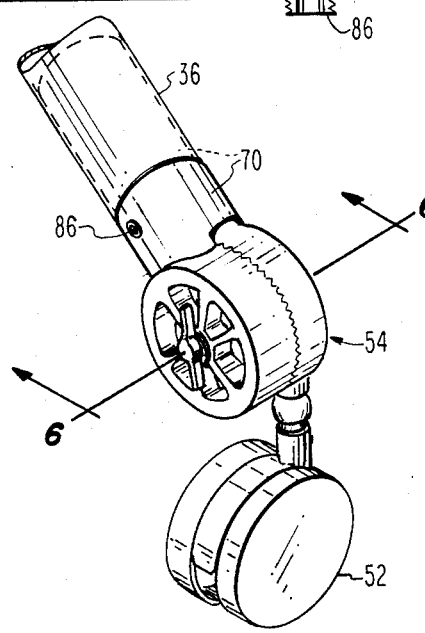
FIG. 5 is an isometric view of another coupling used in the boom assembly of FIGS. 1 and 2.

A basic coupling employed in the particular embodiment of FIGS. 1 and 2 is illustrated in detail in FIGS. 3 and 4 which actually depict two such couplings in combination. Specifically, the coupling includes a hollow body 70 that has an exterior surface 72 of a size and shape to accept an open end portion of a hollow tube in ensleevement thereof. Specifically in this case, the received portion is an open end portion 73 of boom extension 26. In the wall of body 70 are defined a pair of laterally-opposite slots 74 that continue longitudinally inward from one end 76 of body 70. A lateral spreader 78 is of a size and shape to seat within the open-end portion defined by end 76 of body 70.

A lever 80 has one end portion 82 inserted within spreader 78 to affect spreading thereof upon lateral deflection of the other end 84 of lever 80. Carried by body 70 inwardly of its open-end at 76 is a set screw 86 threaded into the body and adjustable to vary the degree of lateral deflection of outer end 82 of lever 80 and thereby expand spreader 78 and in turn change the degree of expansion of the outer end of body 72 so as to enable the body to be tightly secured within the end portion 73 of boom extension 26. A guideway 87 is formed into the interior inner end of body 70 so as to maintain centering of a nose 88 of lever 80 disposed beneath set screw 86.

As shown, spreader 78 is composed of a pair of laterally facing elements 90 and 92 which preferrably are identical. Elements 90 and 92 are constrained upon the outer end 82 of lever 80 by a pin 94 that projects through an aperture 96 in lever 80, openings 97 and 98 near the open end of body 70 accepting pin 94, and being of different sizes to wedge pin 94 into place. Of course, a tapered pin could also be used.

In principle, spreader 78 could be integrally formed as a part of body 70. However, the use of separate and removable elements 90 and 92 facilitates assembly and molding.

It will thus be observed that body 70 constitues a plug insertable within the open end portion of a hollow tube of any utilitarian purpose and can then be adjusted to wedge within that tube. A wide variety of different apparatus may, in a given adaptation, be carried by or formed in the end of body 70 opposite spreader 78.

In the versions of FIGS. 3 and 4, body 70 is necked down from a more inward portion 100 that continues into another necked-down body 102 which is identical to body 70 but projects in the opposite direction, so as to become a mirror image of body 70 except for a desired 180° rotation. That is, body 102 again accepts and contains a spreader 78, lever 80, adjusting set screw 86 and a holding pin 94. In this case, the outer end portion 104 of main boom 24 ensleeves body 102 and is secured by the spreader action onto body 102. Because the elements directly associated with body 102 are desirably identical to those associated with body 70, they need not be further described.

In themselves, the combination of bodies 70 and 102 commonly joined by portion 100 complete a useful assembly for the joinder of one hollow tube serially to the next. Preferably in this case, there is included a sleeve 106 of a size and shape to snugly overlie the common inner end portion 100 of both bodies 70 and 102. Sleeve 106 includes lateral openings as at 108 to accomodate the insertion and adjustment of set screws 86. Openings 109 allow access for pins 94. Although not necessary, sleeve 106 adds a degree of strength to the open ends of each of tubes 24 and 26, while at the same time defining an aesthetically attractive cover for the contained coupling combination.

A rather different utilization of coupling 70 is illustrated in FIGS. 5–8 and specifically depicted as accomodating a caster 52 mounted by a swivel joint 54 at the bottom end of leg 36 of the boom assembly. Swivel joint 54 is in this case coupled to the other or lower end of body 70 and is angularly adjustable about an axis 110 disposed laterally to the longitudinal axis of body 70.

Swivel joint 54 is composed of a pair of discs 112 and 114 that have facing and mating radially corrugated surfaces 116 and 118 that permit indexing of the angular adjustment of swivel joint 54 in discrete steps. A thumb screw 120 projects through a washer 122 and a compression spring 124 as well as a bore in disc 114 into threaded engagement within disc 112. A loosening of thumbscrew 120 permits the indexing-type angular adjustment as between discs 112 and 114 under a lesser degree of continued compression imposed by spring 124.

In this particular case, a plurality of circumferentially spaced apertures 130 permit the attachment of any desired additional appliance to the outer face of disc 112. Thus, the unit of FIGS. 5–8 may find various utilities, and the swivel joint itself has various applications. For example, apertures 130 may be used to mount the side of a speaker cabinet, with the swivel joint preferably including the coupling of 70 for mounting in the upper end portion of an upright tube of a support stand.

Here, however, disc 112 is specifically formed to include a receptacle 132 to captivatingly but frictionally receive a plug 134 which projects upwardly from the hub 136 of caster 52. Hub 136 is rotatable about an axle 138 and a pair of wheels 140 and 142, which again may be identical, are individually disposed on respective opposite sides of the hub and also are rotatably mounted on axle 138. By means of plug 134, hub 136 is rotatably coupled to disc 112 of swivel joint 54 as to rotate about an axis perpendicular to an axis lateral to the longitudinal axis of body 70. A shield 144 forms a chassis and is in this case disposed between wheels 140 and 142 and in a position to substantially overlie the space between those wheels. Shield 144 is basically for aesthetic purposes, although it also assists by impeding the gathering of dust and the like upon axle 138 and the related bearings in the hub and the wheels.

Figure 9:
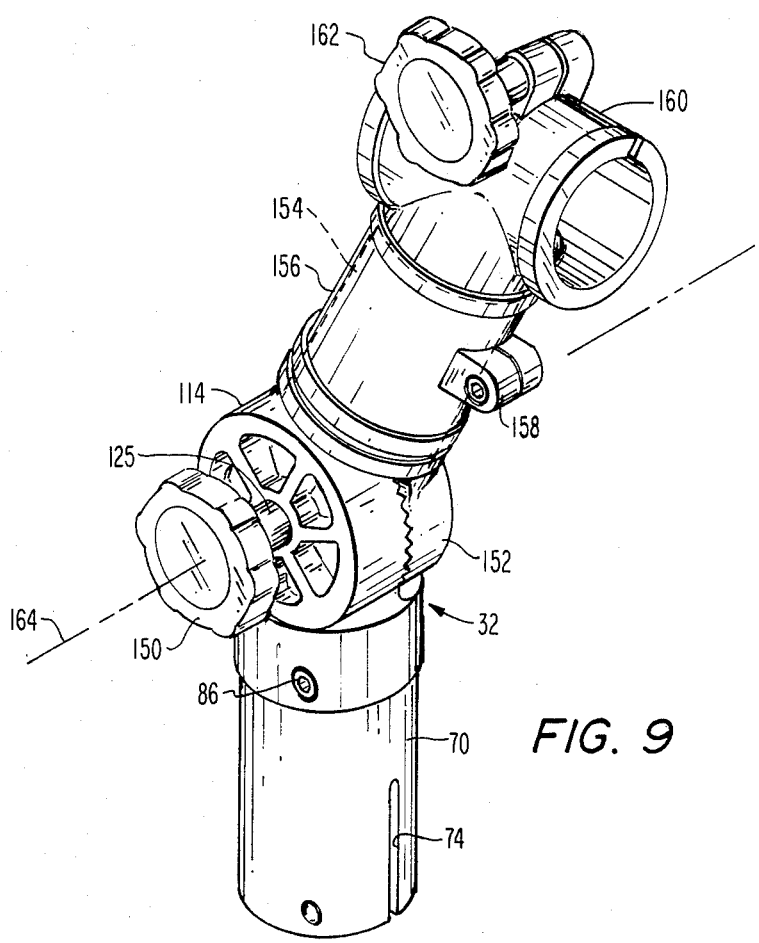
FIG. 9 is a isometric view of a still different coupling used in the assembly of FIGS. 1 and 2.

As depicted in FIG. 9, swivel joint 32 illustrates a further adaptation of the very same coupling body 70 with its associated locking or securement components which remain the same as shown in FIGS. 3 and 4. Here, the swivel joint continues outwardly from coupling 70 to a disc 114 in the same manner as described with respect to FIGS. 5–8. In this case, thumb screw 125 preferably has a larger hand-operable knob 150 as shown. Otherwise, the assembly which includes disk 114 may be identical to that which was used in connection with the caster of FIGS. 5–8.

Cooperating with disc 114 in the same manner of using radial corrugations is in this case a disc 152 from which generally upwardly projects a shank 154 received within a split-sleeve 156 capable of being clamped in place by a screw 158. Sleeve 156 continues into the side of a split collar 160 again adjustably clampable upon boom 24 by means of a knob 162. This combination enables adjustment of the vertical tilt of boom 24 about an axis 164 that is lateral to the longitudinal axis of coupling 70 and, also, in the particular application, relative to a horizontal plane. Sleeve 156 can permit a rotational adjustment of the boom about a vertical axis. Alternatively, and more usually, such rotation relative to the verical is achieved by loosening set screw 86. Knob 162 permits movement of boom 24 through collar or sleeve 160.

As already pointed out, there is a large degree of commonality of parts to permit the taking of maximum identity of different individual components into a variety of various applications and adaptations. All of the parts preferably are molded from rigid plastic, except for the hollow tubes which are joined by those different part combinations. By using a large commonality of individual components, it will be appreciated that cost for molds is substantially reduced.

Even the very same clamping sleeve 160 that mounts swivel joint 32 can be identical to adjustable clamps 56 and 58 that mount accessory apparatus. Such minor items as the different set screws 86 can be common throughout the assembly so that only one tool, such as an allen wrench, is required for assembly or the reverse. The pluralities of knobs used at different points for different purposes can all be the same.

In a particular boom assembly, successful construction has been by way of using 1½ inch aluminum alloy tubing, resulting in tripod stands that weigh only a few pounds, but which will support the order of twelve times their own weight. Yet, modern plastics result in what is heavy-duty construction that provides both use stability and various utility. The modular approach enables the prospective user to select whatever parts he needs for his given requirements on a particular installation.

On the other hand, the very approach to modularity leads to suitability of the basic coupling for other adaptations. As a first example, a tripod or other kind of upright stand is known for the support of items such as light bars or speakers rather than a boom. The use of casters 52 in such an application clearly may be desirable, and at least in some instances swivel joint 32 may also be advantageous.

Another example would be to have couplings 70 project radially from both of discs 112 and 114 of FIG. 7, creating an elbow joint for respective tubing pieces. Further, two of the same discs may be married to create such an elbow joint for use either of couplings 70 or other couplings such as by way of plugs 134.

Any such elbow joint may be mounted within an end portion of associated tubing. A coupling 70 may project laterally from one such disc into the supportive or movable tubing. Or, one may secure an insert into a tubing end portion and fasten a disc thereto by means of a threaded fastener. The approach of modularity permits variation in the selection of result somewhat analogous to the long-enduring "Tinkertoy" approach. For example, the couplings permit ready formation of a framework from which to suspend a background for use in studio photography.

At the same time, the complete implementation as shown in the form of a boom assembly may include a different stand and yet take advantage of either swivel joint 32 or boom coupling 28. Additional modifications which suggest themselves are use of an articulating leg on a tripod stand, so as to allow the whole thing to be mounted on an uneven surface, such as on steps. The intention here is to present brief mention of a wide variety of alternatives available, while yet making use of the basic coupling.

While a particular embodiment of the invention has been shown and described, and numerous modifications and different combinations have been disclosed, it will be obvious to those skilled in the art that changes and further modifications may be made without departing from the invention in its broader aspects. Therefore, the aim in the appended claims is to cover all such changes and modifications as fall within the true spirit and scope of that which is patentable.

We claim:

1. A coupling for securement within an open end portion of a hollow tube and comprising:
   a hollow body adapted to accept said open end portion in ensleevement thereof and in the wall of which body are defined a pair of laterally-opposite slots continuing longitudinally inward from one end of said body;
   a lateral spreader of a size and shape to seat within said one end of said body and being composed of a pair of laterally facing elements positioned about said one end portion of said lever;
   a lever having one end portion inserted within said spreader to effect spreading thereof upon lateral deflection of the other end of said lever;
   and adjustable means carried by said body inwardly of said open end portion for laterally deflecting said other end of said lever.

2. A coupling as defined in claim 1 which includes a member that pins said spreader and said lever in longitudinal location within said body.

3. A coupling as defined in claim 1 in which said body interiorly defines a guideway spaced from said one end of said body to guide movement of said other end of said lever.

4. A coupling as defined in claim 1 which further includes a sleeve adapted to snugly overlie said end portion of said tube when ensleeved upon said body.

5. A coupling as defined in claim 1 which further includes a sleeve adapted to snugly overlie said end portion of said tube when ensleeved upon said body and in which said sleeve includes an opening for accessing of said adjustable means.

6. A coupling as defined in claim 1 which includes a like second hollow body projecting longitudinally in the opposite direction from said one end portion of the first said body, and which further includes a like second spreader, second lever and second adjustable means associated therewith in like association with respect to the open end portion of a second hollow tube.

7. A coupling as defined in claim 1 in which said body is necked down from a more inward portion of said body to define said exterior surface.

8. A coupling as defined in claim 1 which further includes a connector joined to the other end of said body.

9. A coupling as defined in claim 1 which further includes a swivel joint coupled to the other end of said body and angularly adjustable about an axis lateral to the longitudinal axis of said body, and which still further includes a clamp also coupled to said swivel joint as to be swung about said lateral axis upon the angular adjustment of said joint, said clamp being receptive of a tube for securement thereof.

10. A coupling as defined in claim 1 which further includes a swivel joint coupled to the other end of said body and angularly adjustable about an axis lateral to the longitudinal axis of said body, and which also further includes a caster also coupled to said swivel joint as to be swung aobut said lateral axis upon the angular adjustment of said joint.

11. A coupling as defined in claim 1 in which said spreader presents a circumferential exterior surface which engages at least substantially entirely the peripherally facing inner surface of said wall.

12. A boom assembly comprising:
an upright stand mountable on a floor and having a vertical post in the form of a hollow tube;
an elongated boom composed of hollow tubing;
means for coupling an intermediate portion of said boom to the upper end of said post, while enabling adjustment of orientation of said boom in both vertical and horizontal directions;
a linear extension member for said boom and in the form of a hollow tube;
means for coupling said extension member to an end of said boom;
said stand including a plurality of legs each in the form of a hollow tube;
a plurality of foot elements;
means for coupling each of said foot elements individually to respective different ones of said legs;
and at least one of said coupling means including means for securement within an open end portion of the coupled hollow tube that further comprises:
a hollow body having an exterior surface of a size and shape to accept said open end portion in ensleevement thereof and in the wall of which body are defined a pair of laterally-opposite slots continuing longitudinally inward from one end of said body;
a lateral spreader of a size and shape to seat within said one end of said body and being composed of a pair of laterally facing elements positioned about said one end portion of said lever;
a lever having one end portion inserted within said spreader to effect spreading thereof upon lateral deflection of the other end of said lever;
and adjustable means carried by said body inwardly of said open end portion for laterally deflecting said other end of said lever.

13. A coupling as defined in claim 12 in which said securement means is operative selectively for any one or more of said coupling means.

14. A coupling element as defined in claim 12 in which said spreader presents a circumferential exterior surface which engages at least substantially entirely the peripherally facing inner surface of said wall.

* * * * *